United States Patent

[11] 3,546,388

[72] Inventors Stanislas Kobus
Antwerp, Belgium;
Adelin Eugene Gaston Salle, Paris, France

[21] Appl. No. 698,960
[22] Filed Jan. 18, 1968
[45] Patented Dec. 8, 1970
[73] Assignee International Standard Electric Corporation
New York, New York
a corporation of Delaware
[32] Priority Jan. 23, 1967
[33] Netherlands
[31] 6701053

[54] LINE SCANNING SYSTEM WITH STORED PROGRAM CONTROL
10 Claims, 2 Drawing Figs.

[52] U.S. Cl. .......... 179/18
[51] Int. Cl. .......... H04m 3/22
[50] Field of Search .......... 179/18.6, 18.6(A)

[56] References Cited

UNITED STATES PATENTS 3,430,001 2/1969 Gianola et al. .......... 179/18(.6)
3,254,157 5/1966 Guercio et al. .......... 179/18(.6)

*Primary Examiner*—Kathleen H. Claffy
*Assistant Examiner*—Thomas W. Brown
*Attorneys*—C. Cornell Remsen, Jr., Rayson P. Morris, Percy P. Lantzy, J. Warren Whitesel, Phillip A. Weiss and Delbert P. Warner

ABSTRACT: A line scanning system for detecting the appearance of new line conditions. The line condition changes are detected by an exclusive OR function $Z = \bar{X}Y + X\bar{Y}$. where Y is the OR function L + Cor (L = the line loop state; Cor = the cutoff relay state) obtained from the line scanning operation and where X is the value of the function y at the previous scan obtained from a memory element associated with the considered line. Only one core or other type memory element is needed to store the previous condition X of the line even though both the line loop and cutoff relay state are monitored. Note that line condition change involves the recognition of a two bit code. (Z = exclusive OR between X and Y).

Figure 1:
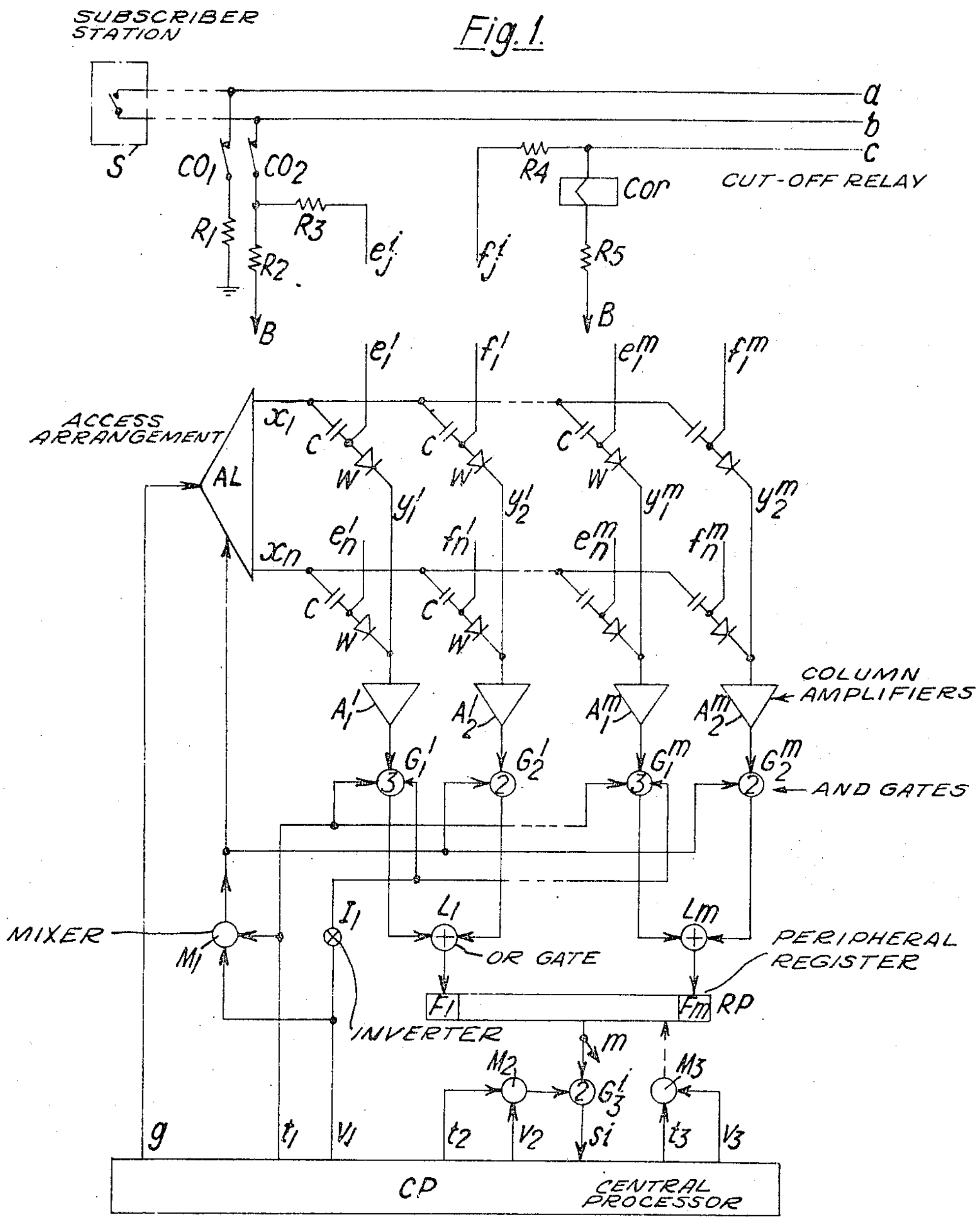

*Inventors*
S. Kobus - A. Salle

By [signature] *Attorney*

*Inventor* s

S. Kobus - A. Salle

By

Attorney

LINE SCANNING SYSTEM WITH STORED PROGRAM CONTROL

The present invention relates to a telecommunication system including, line scanning means, line condition detecting means and memory means storing information about the last state of the lines which precedes their scanning.

Such a telecommunication system is known from the article "Outlines of a T.D.M. two-wire telephone switching system and its control" by H.H. Adelaar et al. published in 1961, in Vol. 107, Part B, supplement No. 20 of the proceedings of the Institute of Electrical Engineers (Paper E No. 3391, Nov. 1960).

Generally in the semi- and full-electronic switching systems, the appearance of new line conditions is detected by means of a line scanning taking place periodically for the different lines. The line scanning consists in obtaining from a line scanner the state of the a subscriber's loop plus eventually the state of the cutoff relay which is associated thereto. These states expressed in binary information, are next compared to binary information stored in a memory, the latter stored information relating to the last previous state of the line. Up to now, it was generally admitted that two binary bits were necessary for the above stored information. These two bits, sometimes called busy and parking bits, were used in combination with one or two additional bits for characterizing the different possible line conditions. In this way, the detection of the line conditions requesting a certain action, e.g. a new call condition, involved the recognition of particular three or four bit codes.

It is an object of the present invention to provide an improved telecommunication system of the above type.

The present telecommunication system is characterized by the fact, that said memory means store the last previous states of the line loops and of their associated cutoff relays.

According to another characteristic of the invention, the last previous state of a line loop and of its associated cutoff relay is expressed by a binary logical function thereof whose value is stored in said memory means. Thus, according to a preferred embodiment of the inventive line scanning system, means are provided to periodically scan the state of the subscribers lines. Memory means store the information about the last state of the line as observed in the prior scanning. Line condition detecting means compares the information obtained from the present scanning means with the corresponding information obtained from the memory means to determine new line conditions. The scanning means and the memory means are concerned not only with the line loop but also with the associated cutoff relays. Despite these two classes of information, only a one bit memory means is required because of the use of an OR function for denoting the state of the line loop or the cutoff relay associated therewith. The memory records the binary value of the logical function of the state of the line loop and the associated cutoff relay.

Figure 2:
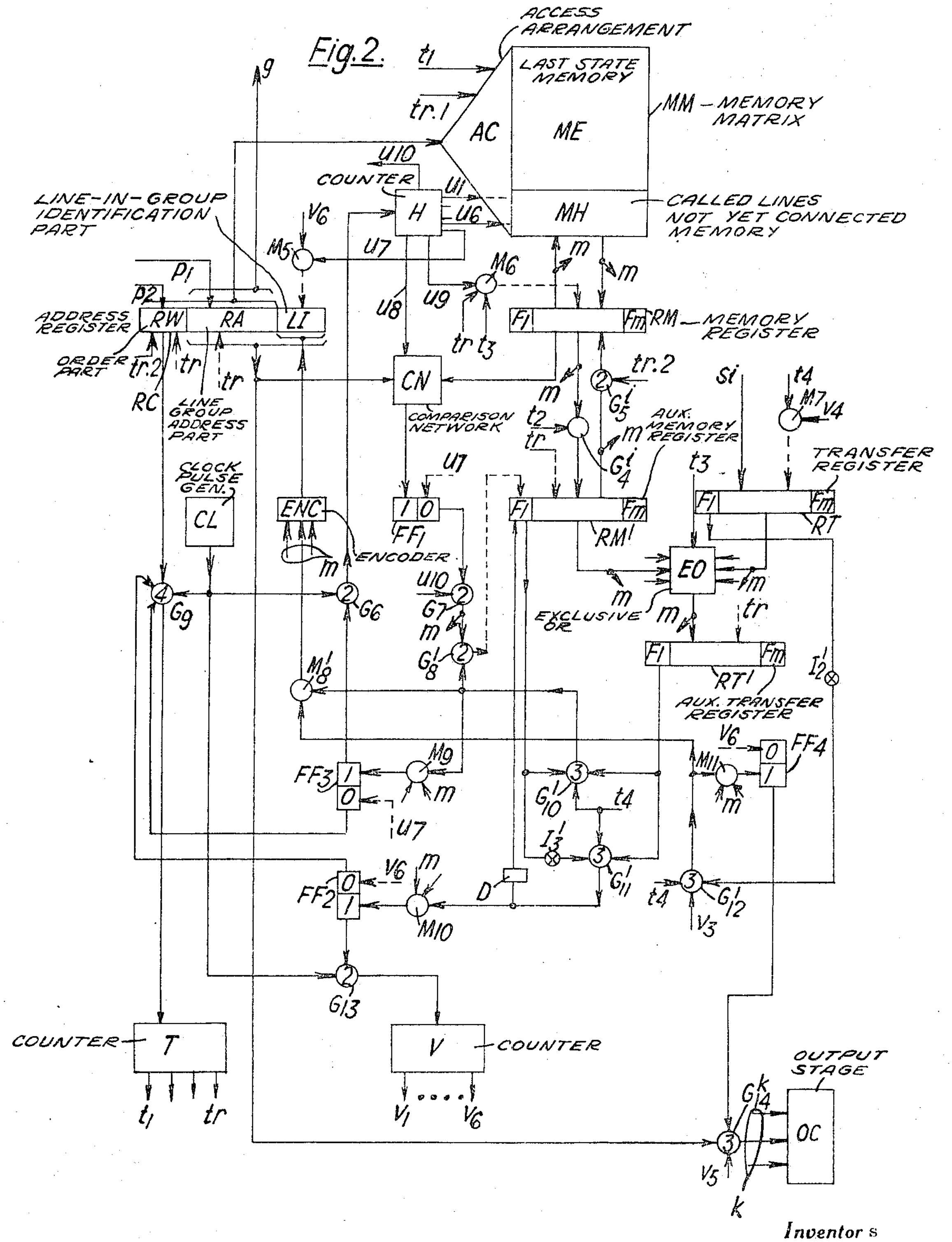

The above mentioned and other objects and features of the invention will become more apparent and the invention itself will be best understood by referring to the following description of embodiments taken in conjunction with the accompanying drawings in which:

FIG. 1 schematically represents a line scanner and a central processor which make part of a telecommunication system in accordance with the invention;

FIG. 2 shows in detail part of the circuitry of the central processor of FIG. 1;

Referring to FIG. 1, the telecommunication system part shown therein includes $mn$ subscriber line circuits divided in $n$ line groups of $m$ line circuits. Each subscriber line circuit is constituted by a two-wire $a$, $b$, coupling a corresponding subset S to a junctor circuit (not shown) of the central office serving the $mn$ subscriber lines and by an associated cutoff relay Cor. The line conductors $a$ and $b$ are connected to ground and to the negative terminal of a battery B, through the series connection of a first break contact $co1$ of the relay Cor and a resistor R1 and through the series connection of a second break contact $co2$ of the relay Cor and a resistor R2, respectively. The cutoff relay Cor has one end connected to the negative terminal of battery B through a resistor R5 and its other end coupled to the above mentioned junctor circuit through a conductor $c$ and several switches operable by a marker (not shown). The junction points of the contact $co2$ and resistor R2 and of the relay Cor and conductor $c$, which constitute the scanned pair of points of a subscriber line circuit, are connected to one end of a resistor R3 and a resistor R4 respectively. The other ends of resistors R3 and R4 of each of the $mn$ subscriber line circuits are connected to a line scanner through corresponding conductors $e^i_j$ and $f^i_j$ respectively ($i = 1$ to $m$, $j = 1$ to $n$). The line scanner comprises a matrix arrangement having $n$ rows $x1$ $xn$ and $m$ pairs of columns $y^1_{1,2}$ to $y^m_{1,2}$ and an associated access arrangement AL which enables the selection and interrogation of any one of the matrix rows $x1$ to $xn$. The free ends of the above mentioned conductors $e^i_j$ and $f^i_j$ are respectively connected, on the one hand to the rows $x_j$ ($j = 1$ to $n$ ) via individual capacitors C and on the other hand to the columns $y^i_1$ and $y^i_2$ ($i = 1$ to $m$ ) via individual diodes $w$. In this way, the $n$ rows $X1$ to $xn$ and $m$ pairs of columns $y^1_{1,2}$ to $y^m_{1,2}$ of the scanner matrix are assigned to the $n$ groups of $m$ lines and to the $m$ pairs of scanned points of each group of $m$ lines, respectively. The access arrangement AL is conventional and therefore it is not shown in detail and it will only generally be depicted hereinafter. The access arrangement AL may for instance be constituted by a decoder matrix arrangement having $g$ inputs and $n$ outputs, an interrogation signal generator and $n$ AND-gating circuits each having three inputs and one output. The $g$ inputs of the above decoder matrix arrangement are respectively connected to $g$ outputs of a register of a central processor CP which will later be described. The $n$ outputs of the $n$ AND-gating circuits are respectively connected to the $n$ rows ($x1$ to $xn$) of the scanner matrix arrangement. The three inputs of each of these $n$ AND-gating circuits are connected as follows: the first one, in common, to the output of the interrogation signal generator, the second one to a respective output of the above decoder matrix, and the third one, in common, to an output of a two-input mixer M1. The two inputs of mixer $m1$ are respectively connected to two timing outputs $t1$, $v1$ of central processor CP.

The output ends of the $m$ pairs of columns $y^1_{1,2}$ to $y^m_{1,2}$ are connected to the respective inputs of $m$ corresponding pairs of column amplifiers $A^1_{1/2}$ *to* $A^m_{1/2}$. The output of each column amplifier $A^i_1$ ($i = 1$ to $m$) is connected to one input of a corresponding three-input AND gate $G^i_1$ whereas the output of each column amplifier $A^i_2$ is connected to one input of a corresponding two-input AND gate $G^i_2$. The other two inputs of each of the gates $G^i_1$ are respectively connected to the timing outputs $t1$ and $v1$ of central processor CP, directly and through an inverter I1. The other input of each of the gates $G^i_2$ is connected to the output of the two-input mixer M1. The two outputs of each pair of AND gates $G^i_{1,2}$ are respectively connected to two inputs of a corresponding two-input OR gate $Li$, the outputs of the OR gates L1 to $Lm$ being connected to the respective one-inputs of $m$ flip-flops F1 to $Fm$ of a peripheral register RP. The one-output of each flip-flop $Fi$ of register RP is connected to one input of a corresponding two-input AND gate $G^i_3$. The other input of each of the above AND gates $G^i_3$ is connected to the output of a two-input mixer M2 of which the two inputs are connected to two respective timing outputs $t2$ and $v2$ of central processor CP. The $m$ outputs $s1$ to $sm$ of AND gates $G^1_3$ to $G^m_3$ are connected to $m$ corresponding inputs of central processor CP. The O-inputs of flip-flops F1 to $Fm$ of peripheral register RP are connected to the output of a two-input mixer M3, of which the two inputs are connected to two respective timing outputs $t3$ and $v3$ of central processor CP. The above connection of the O-inputs of the flip-flops F1 to $Fm$ of register RP to the output mixer M3 has been indicated in a dotted line, because this connection serves for the resetting of register RP. In a similar way, all the resetting connections of the bistable devices hereinafter described will be indicated in dotted lines.

FIG. 2 shows in detail the part of central processor CP, which is associated to the line scanning. This part includes a ferrite core matrix memory MM, an associated access arrangement AC and an address and a memory registers RC and RM respectively. The matrix memory MM is constituted by two parts: a part ME having $n$ rows and $m$ columns respectively assigned to the $n$ line groups and to the $m$ lines of each group, and a part MH having $m$ columns in common with the part ME and an appropriate number of rows, which is chosen equal to six in the present example of description. Each of the bits of the memory part ME stores information about the last state of its associated line, whereas the rows of part MH temporarily store the identities of the called lines which are not yet connected. The address register RC is constituted by three parts: an order part RW, a line group address part RA and a line-in-group identification part LI. The order part RW comprises two flip-flops (not shown) having their one-inputs connected to two respective outputs of a program register (not shown) via a two-conductor connection indicated by $p2$, and their one-outputs connected to appropriate gating circuits of access arrangement AC which will later be described. The line group address part RA comprises $g$ flip-flops (not shown) having their one-inputs connected to $g$ corresponding outputs of the above program register (not shown) via a $g$-conductor connection indicated by $p1$, and their one-outputs connected, on the one hand to the respective $g$ inputs of the decoder matrix of the previously described access arrangement AL via a $g$-conductor connection indicated by $g$, and on the other hand to $g$ corresponding inputs of a decoder matrix of the access arrangement AC of memory MM. The above number $g$ is at least equal to $\log_2 (n + 6)$. The line-in-group identification part LI comprises at least $d = \log_2 m$ flip-flops (not shown) of which the one-input and one-output connections will later be described. The register RM comprises $m$ flip-flops F1 to F$m$, which register an output information from memory MM or an input thereto information.

The access arrangement AC is conventional and therefore it is not shown in detail and it will only generally be depicted hereinafter.

This access arrangement may for instance be constituted by a decoder matrix having $g$ inputs and $n + 6$ outputs, two signal generators, i.e. one for the reading operation signals and the other one for the writing operation signals, and 2 $(n + 6)$ AND-gating circuits. The writing operation signal generator is connected to the $n + 6$ rows of memory MM via $n + 6$ respective AND-gating circuits each having the following controls: a writing order control, taken from the one-output of the writing order flip-flop of part RW of register RC; a row selection control, taken from a respective output of the above decoder matrix; and a timing control. The timing control of the above $n$ AND-gating circuits associated to the $n$ rows of memory part ME is taken from an output $t_{r-1}$ of a counter T, which will later be described, whereas the timing control (not shown) of the 6 AND-gating circuits associated to the 6 rows of memory part MH is taken from another circuit which is not shown, as having no relation with the described line scanning and line condition detecting arrangements. In a similar way the reading operation signal generator is connected to the $n + 6$ rows of memory MM via the other $n + 6$ respective AND-gating circuits. Each of the $n$ of these AND-gating circuits which are associated to the $n$ rows of memory part ME has the following controls: a reading order control taken from the one-output of the reading order flip-flop of part RW of register RC; a row selection control taken from a respective output of the above decoder matrix; and a timing control taken from an output $t1$ of the above mentioned counter T. Each of the 6 AND-gating circuits respectively associated to the 6 rows of memory part MH has an individual timing control taken from six respective outputs $u1$ to $u6$ of a counter H, which will later be described.

The central processor part of FIG. 2, further comprises three registers RT, RM' and RT' each constituted by $m$ flip-flops indicated by the references F1 to F$m$. The one-inputs of flip-flops F1 to F$m$ of register RT are connected to the $m$ respective outputs of AND gates $G^1_3$ to $G^m_3$ (FIG. 1). In this way all the data transferred from peripheral register RP to central processor CP, are first registered by register RT thereof. Registers RM' and RT' are auxiliary registers associated to the registers RM and RT respectively. The one-outputs of flip-flops F1 to F$m$ of register RM are connected to the one-inputs of flip-flops F1 to F$m$ of auxiliary register RM', through a set of $m$ two-input AND gates $G^1_4$ to $G^m_4$ respectively. In a similar way, the one-outputs of flip-flops F1 to F$m$ of auxiliary register RM' are connected to the one-inputs of flip-flops F1 to F$m$ of register RM through another set of $m$ two-input AND gates $G^1_5$ to $G^m_5$ respectively. The second inputs of the above two-input AND gates $G^i_4$ and $G^i_5$ ($i = 1$ to $m$) are connected to two respective outputs $t2$ and $tr$-2 of counter T. The above one-outputs of flip-flops F1 to F$m$ of register RM', are further connected to $m$ corresponding inputs of an "exclusive OR" gating network EO, which has $2m+1$ inputs and $m$ outputs. The ($2m+1$ input of the network EO, indicated by $t3$, constitutes an enabling input connected to the corresponding output of counter T. The remaining $m$ inputs of network EO are respectively connected to the one-outputs of flip-flops F1 to F$m$ of register RT. The $m$ outputs of the "exclusive OR" gating network EO, are connected to the respective one-inputs of flip-flops F1 to F$m$ of the auxiliary register RT'. The above "exclusive OR" gating network, when enabled, performs individually the "exclusive OR" functions between the information bits stored by the homologue flip-flops F$i$ of registers RM' and RT. The $m$ bits indicating the values of these "exclusive OR" functions are fed through the $m$ outputs of the network EO to the corresponding flip-flops F$i$ of register RT' wherein they are registered. The one-outputs of the flip-flops F1 of registers RM' and RT' are connected to two respective inputs of one three-input AND gate $G^1_{10}$ out of a set of $m$ similar AND gates $G^i_{10}$ (gates $G^2_{10}$ to $G^m_{10}$ not shown). The one-outputs of flip-flops F1 of registers RM' and RT' are further connected to two inputs of one three-input AND gate $G^1_{11}$ out of another set of $m$ similar AND gates $G^i_{11}$ (gates $G^2_{11}$ to $G^m_{11}$ are not shown), through an inverter $I^1_3$ and directly, respectively. In a similar way, the one-outputs of the other flip-flops F2 to F$m$ of registers RM' to RT', are directly connected to the respective inputs of the AND gates $G^2_{10}$ to $G^m_{10}$ and to the respective inputs of the AND gates $G^2_{11}$ to $G^m_{11}$ through corresponding inverters $I^2_3$ to $I^m_3$ (not shown) and directly, respectively. The third input of the AND gates $G^i_{10}$ and $G^i_{11}$ ( $i = 1$ to $m$) is connected to the output $ti + 3$ of counter T. The output of the AND gate $G^i_{10}$ is connected: to one input of a corresponding two-input mixer $M^i_8$, to one input of a corresponding two-input AND gate $G^i_8$, and to a corresponding input of an $m$-input mixer M9. The output of the $m$-input mixer M9 is connected to the one-input of a flip-flop FF3. The output of mixer $M^i_8$ is connected to a corresponding input of an $m$-input encoder ENC, which translates a 1-out-of-$m$-input code to a $d$-bit output code ($d = \log_2 m$). The $d$ outputs of the encoder ENC are correspondingly connected to the one-inputs of the $d$ flip-flops of part LI of register RC. The output of gate $G^i_{11}$ is connected on the one hand, to the one-input of the flip-flop F$i$ of register RM' through a delay D, and on the other hand, to a corresponding input of an $m$-input mixer M10, the output of which is connected to the one-input of a flip-flop FF2. The one-output of flip-flop FF2 is connected to one input of a two-input AND gate G13, of which the other input is connected to the output of a clock pulse generator CL. The output of AND gate G13 is connected to the advance input of a counter V. This counter V is able to assume six consecutive count conditions, starting from a rest condition, under the control of the clock pulses applied to its advance input and to automatically return to the rest condition after the sixth count condition. A decoder arrangement making part of the counter V enables the conversion of the above six consecutive count conditions in six consecutive pulses $v1$ to $v6$ appearing on the respective corresponding outputs of counter V. The one-output of flip-flop F$i$ of register RT is connected via an inverter $I^i_2$ to one input of one corresponding three-input AND gate $G^i_{12}$ out of a set of *m* three-input AND gates $G^1_{12}$ to $G^m_{12}$. The other two inputs of the gate $G^i_{12}$ are respectively connected to the output *ti*+ 3 of counter T and to the output $v_4$ *of counter V. The output of the AND gate* $G^i_{12}$ is connected, on the one hand, to the second input of the above mentioned mixer $M^i$ 8 and on the other hand to a corresponding input of an *m*-input mixer M11. The output of the mixer M11 is connected to the one-input of a flip-flop FF4. The one-output of the flip-flop FF3 is connected to one input of a two-input AND gate G6, of which the other input is connected to the output of the clock pulse generator CL. The output of the two-input AND gate G6 is connected to the advance input of a 19-condition counter H. This counter H is able to assume 19 consecutive count conditions, starting from a rest condition, under the control of the clock pulses applied to its advance input and to automatically return to the rest condition after the 19th count condition. A decoder arrangement making part of the counter H enables the conversion of the above 19 consecutive count conditions in 19 consecutive pulses *h*1 to *h*19 appearing on ten outputs thereof *u*1 to *u*10 in the following way:

Output μ1—pulse h1.
Output μ2—pulse h4.
Output μ3—pulse h7.
Output μ4—pulse h10.
Output μ5—pulse h13.
Output μ6—pulse h16.
Output μ7—pulse h19.
Output μ8—pulses h2, h5, h8, h11, h14, h17.
Output μ9—pulses h3, h6, h9, h12, h15, h18.
Output μ10—pulse h18.

The output *u*9 of counter H is connected to the O-input of flip-flops F1 to F*m* of memory register RM through a three-input mixer M6, whereas the output *u*8 thereof is connected to an enabling input of an AND-gating comparison network CN. This network CN has further 2(*g*+*d*) inputs, the *g*+*d* of which are respectively connected to the one-inputs of the *g*+*d* flip-flops of parts RS and LI of register RC and the other G=*d* to the respective one-outputs of *g*+*d* flip-flops of register RM, i.e. to the one-outputs of flip-flops F1 to F1, where $1 = g + d < m$. The comparison network CN, when enabled, compares the information registered in the parts RA and LI of register RC to the information registered in the corresponding part of register RM, the result of this comparison, i.e. coincidence or not coincidence, appearing on a single output thereof, which is connected to the one-input of a flip-flop FF1. The output *u*7 of counter H is connected, on the one hand to the O-input of the *d* flip-flops of part LI of register RC through a two-input mixer M5, and on the other hand to the O-input of flip-flops FF1 and FF3. The output *u*10 of counter H is connected to one input of a two-input AND gate G7 of which the second input is connected to the O-output of flip-flop FF1. The output of AND gate G7 is connected to one input of each gate of a set of *m* two-input AND gates $G^1_8$ to $G^m_8$, which have their second inputs respectively connected to the outputs of the three-input AND gates $G^1_{10}$ to $G^m_{10}$. The outputs of AND gates $G^i_8$ are respectively connected to the O-inputs of flip-flops F*i* of register RM'. The O-outputs of flip-flops FF2 and FF3 are connected to two corresponding inputs of a four-input AND gate G9. The other two inputs of AND gate G9 are respectively connected to the output of clock generator CL and to the one-outputs of the previously mentioned reading and writing order flip-flops of order part RW of register RC, via a two-input mixer (not shown) included in block RW. The output of four-input AND gate G9 is connected to the advance input of counter T. This counter T is able to assume *r* consecutive count conditions, starting from a rest condition, under the control of the clock pulses applied to its advance input, and to automatically return to the rest condition after the *rth* count condition. A decoder arrangement forming part of counter T, enables the conversion of the above *r* consecutive count conditions in *r* consecutive pulses *t*1 to *tr* appearing on the respective homonyme outputs thereof ($r = m+6$). The output *tr* of counter T is connected; to the O-input of flip-flops T1 to F*m* of registers RM' and RT'; to the O-input of the $g + 2$ flip-flops of parts RW and RA of register RC; and to a second input of the previously mentioned three-input mixer M6. The third input of mixer M6 is connected to the output *t*3 of counter T. The one-outputs of the $g + d$ flip-flops of parts RA and LI of register RC are connected to $g + d$ inputs of an output arrangement OC via a set of *m* two-input AND gates $G^k_{14}$, respectively ($k = 1$ to $g + d$). The other two inputs of each of the AND gates $G^k_{14}$ are respectively connected to the one-output of flip-flop FF4 and to the output V5 of counter V. The O-inputs of flip-flops F1 to F*m* of register RT are connected to the outputs *t*4 and *v*4 of counters T and V via a two-input mixer M7.

Before starting the description of the operation principle of the circuits of FIGS. 1 and 2, a brief description of the principle on which the circuit realisation of FIGS. 1 and 2 has been based, will hereinafter be outlined.

As already mentioned in the introductory part, the aim of the line scanning is to detect the appearance of new line conditions. The detection of the changes of the line loop and of its associated cutoff relay conditions, may be facilitated by using the forementioned previous line state two information bits for indicating the respective preceding states of the line loop and of its cutoff relay. Indeed, the comparison of the loop L and cutoff relay Cor states of a line, obtained by the line scanning operation, to the previous states thereof, obtained from a memory, readily leads to the recognition of all particular condition changes involving an action to be carried out. However, a more economical solution consists in replacing the two separate comparisons by one comparison between the logical expression $Y = L + Cor$ (inclusive OR) and one bit X stored in the above memory (memory part ME of FIG. 2), which gives the preceding value of this logical expression Y. The discrepancies will be obtained by the logical function: $Z = X\bar{Y} + \bar{X}Y$ (exclusive OR). This solution is summarized in the following table wherein the O- and 1-conditions of the line loop (L) and of the cutoff relay Cor of the considered subscriber line, mean, open and closed loop and released and operated cutoff relay, respectively:

| | L | Cor | Y | X | Z | Action |
|---|---|---|---|---|---|---|
| Condition: | | | | | | |
| Idle | 0 | 0 | 0 | 0 | 0 | |
| Busy | 0 | 1 | 1 | 1 | 0 | |
| Parking | 1 | 0 | 1 | 1 | 0 | |
| Normal release | 0 | 0 | 0 | 1 | 1 | Reset X. |
| Forced release | 0 | 0 | 0 | 1 | 1 | Do. |
| Forced release | 1 | 0 | 1 | 1 | 0 | |
| Out of parking | 0 | 0 | 0 | 1 | 1 | |
| New call | 1 | 0 | 1 | 0 | 1 | Processing of calling line. |
| Processing of calling line: | | | | | | |
| Start | 1 | 0 | 1 | 1 | 0 | |
| Cor driven | 1 | 1 | 1 | 1 | 0 | |
| Cor operated | 0 | 1 | 1 | 1 | 0 | |
| Processing of called line: | | | | | | |
| Start | 0 | 0 | 0 | 1 | 1 | Do nothing. |
| Cor driven | 0 | 1 | 1 | 1 | 0 | |
| Cor operated | 0 | 1 | 1 | 1 | 0 | |
| Manual operation of the Cor: | | | | | | |
| Cor driven | 0 | 1 | 1 | 0 | 1 | Set X. |
| Cor operated | 0 | 1 | 1 | 0 | 1 | Do. |

In the first column of the above table, several line conditions have been reported and in the subsequent columns there have been indicated the corresponding binary values of the line loop state L, the cutoff relay state Cor, the OR function $Y = L + Cor$, the memorized bit X giving the preceding value of the function Y, and the "exclusive OR" function $Z = X\bar{Y} + \bar{X}Y$. In the last column, at the right end of the table, there have been indicated the actions which have to be carried out in connection with the line scanning and in correspondence with the different line conditions. It is to be noted in relation to the binary values of column L, that when the cutoff relay Cor is operated (Cor = 1), the $\overline{\text{line}}$ loop appears as open (L = O), because the access from the line scanner to the line loop is then broken by the operated break contacts (*co*1 and *co*2) of relay Cor (FIG. 1).

Hereinafter the conditions reported in the above table will briefly be commented on.

The first three line conditions (idle, busy, parking) correspond to the three "steady" conditions of a line. It appears immediately that these three conditions will not be detected by the "exclusive OR" function Z, since the value of this function Z is equal to zero for these conditions.

In the case of normal release, the reset of the bit X has to be carried out in connection with the line scanning because in the telecommunication system of the present example of description, the identities of the subscriber lines are not memorized during the conversation, in case of local calls.

When a connection is released, i.e. when the calling subscriber releases or at the end of the timing of "delayed back release", the line of the subscriber who has not released, has to be put in parking in order not to be detected as a calling line. This condition has been called "forced release". In the present solution, the latter line is automatically in parking except if the line scanner examines the line when the holding path of the cutoff relay Cor is just cut, its break contacts being still open. This case is unlikely because the above transient time interval in the release of the cutoff relay Cor is of the order of 1 millisecond, while the cycle time of the line scanning is much longer than 1 millisecond. If however this case occurs, the bit X of the memory will be reset and at the next scanning cycle, this line will be detected as originating a call.

The out of parking condition occurs when a subscriber, whose line is in parking, replaces his handset. Then, his line has to be restored in the idle condition (reset bit X).

The detection of a new call condition initiates the processing of the calling line. This processing consists in the setting of the memory bit X, for rendering the calling line busy, and the transmission of the calling line identity to a register circuit. This register in association with a marker enables the connection of the calling line to a junctor circuit and the energization of the associated cutoff relay Cor. The condition indicated by "Cor driven" corresponds to the case, the line scanner examines the line when the cutoff relay Cor is just energized, its contacts *co*1, *co*2 being still closed.

Concerning the processing of a called line, it is to be noted, that the setting of the bit X and the inscription of the line identity to the previously described called line temporary memory (memory part MH of FIG. 2), is carried out independently from the line scanning operation. The condition "start" of the called line processing, for which the "exclusive OR" function Z = 1, is similar to the conditions requiring a reset X action. Hence, whenever such one of these conditions is detected, the identities of the called lines stored in the above temporary memory have to be examined, the reset of the bit X has to be carried out only in the case the identity of the examined line is not contained in the above temporarily stored identities.

The last case "manual operation of the Cor" corresponds to a facility according to which, it is enabled to render any subscriber's line busy by operating manually the associated thereto cutoff relay from the main distributing frame of the exchange. Whatever of the two conditions "Cor driven" or "Cor operated" the line assumes at the moment of its scanning, the action relative thereto to be carried out, is the setting of the bit X, in order to render the line busy.

From the preceding table and the explanation relative thereto, it may now easily be deduced, the way of detection of the several conditions which involve an action to be carried out, as well as the kind of this action:

If Z = 0, no action has to be carried out.

If Z = 1 and X = 1, the identity of the examined line has to be compared to the called line identities stored in the called line memory (memory part MH of FIG. 2); if no coincidence occurs, the bit X has to be reset to 0.

If Z = 1 and X = 0, the bit X has to be set to 1; if additionally Cor = 0, the new call processing has to be started.

With the previous considerations, the operation of the circuits of FIGS. 1 and 2, which will hereinafter be described, may easily be understood.

When the scanning of a group of *m* subscriber lines is to be started, the register RC (FIG. 2) receives, at a first time the address of the above line group in its part RA, and at a second time an interrogation or reading order in its part RW from a program counter (not shown) through the respective inputs thereof *p*1 and *p*2. The line group address, registered in part RA of register RC, enables the selection of the row which is assigned to this line group in both the scanner matrix (rows *x*1 to *xn* in FIG. 1) and the ferrite core memory part ME(FIG. 2) through the respective access arrangements AL and AC. The reading order registered in the corresponding flip-flop of the part RW, on the one hand prepares the readout operation of selected row of the matrix memory part ME and on the other hand enables the four-input AND gate G9. The clock pulses of clock generator CL are thus transmitted to counter T via the enabled AND gate G9, and counter T starts its counting cycle. The pulse *t*1 of counter T applied to the appropriate circuits of the access arrangements AL and AC enables the readout operation of the above mentioned selected rows of scanner matrix and memory part ME. The readout operation of the selected row of memory part ME takes place in a conventional way. The readout operation of the selected row of the scanner matrix takes place as follows: The scanned line loop point which is constituted by the junction point of the resistors R2 and R3 (FIG. 1) is at the battery B negative potential, e.g. −48 Volts, as long as the line loop *a*, *b* is open or the break contacts *co*1 and *co*2 of the cutoff relay Cor are operated. When the line loop *a*, *b* is closed, i.e. when the gravity make contact of the subset S is closed, the above point is brought at a second potential more positive than the first one, e.g. −24 Volts. Similarly, the scanned point of the cutoff relay Cor, which is constituted by the junction point of resistor R4 and relay Cor, is at the battery B negative potential as long as the relay Cor is in the rest condition. When the relay Cor is energized via the conductor *c*, the scanned point of relay Cor is brought at the above said second potential, e.g. −24 Volts. The scanner matrix diodes W, which are associated to the scanned points of the subscriber's lines are normally in their blocking condition their anodes being at the potential of their condition their associated scanned points, e.g. either −48 Volts or −24 Volts, whereas their cathodes are at a more positive potential than both above potentials. The reading voltage pulse applied to the selected row of scanner matrix at the moment of occurrence of the pulse *t*1, has such an amplitude, that the selected row diodes W of which the anode was at the above mentioned second potential (−24 Volts), will become conductive, this resulting to the appearance of an one-output signal on the corresponding columns $y'_{1,2}$. The other diodes W will remain in the blocked condition so that no output signal, i.e. a O-output signal, will appear on their corresponding columns. The AND gates $G'_1$ and $G'_2$ being enabled at the occurrence of pulse *t*1, the above one-output signals, amplified by the amplifiers $A'_1$ and $A'_2$, are applied to the corresponding inputs of the OR gates L*i* respectively. The output signals of the *m* OR gates L*i* which correspond to the values of the *m* respective OR functions L*i* + Cor*i* of the *m* lines comprised in the examined group of lines, are registered by the corresponding flip-flops F*i* of peripheral register RP. In this way at the end of pulse *t*1, the *m* last previous line state information bits X*i* and the *m* present state information bits Y*i* (Y*i* = L*i* + Cor*i*) are registered by the *m* flip-flops F*i* of registers RP and RM respectively. The second pulse *t*2 of counter T, applied to the AND gates $G'_3$ and $G'_4$, causes the transfer of the information bits registered in registers RP and RM to registers RT and RM' respectively. The third pulse *t*3 of counter T causes the reset of registers RP and RM and the enabling of the "exclusive OR" gating network EO which thus forms the $m$ "exclusive OR" functions $Zi = Xi\bar{Y}i + \bar{X}iYi$, the binary values of these functions $Zi$ being registered by the corresponding flip-flops of register RT'.

Up to now, i.e. during the first three pulses $t1$, $t2$, $t3$ of the counter T, the $m$ lines of the scanned group of lines or the relative thereto information bits have been handled in parallel. From the moment of occurrence of the fourth pulse $t4$, a second cycle is started, which consists in the sequential examination of the states of the $m$ lines of the scanned group, one line having to be handled completely before starting with the next one.

Hereinafter, only the handling of the first line of the scanned group of lines will be described in detail, the information bits Z1 and X1 relative to this first line being registered by the flip-flops F1 of registers RT' and RM' respectively. The handling of the remaining $m$-1 lines of the above group takes place in a similar way.

The fourth pulse $t4$ of counter T is applied, on the one hand to the O-inputs of the flip-flops F1 to F$m$ of register RT through the mixer M7, and causes the reset of these flip-flops, and on the other hand to a corresponding input of the three-input AND gates $G^1_{10}$, $G^1_{11}$ and $G^1_{12}$.

Assuming that the flip-flop F1 of register RT' is in the O-condition, i.e. the binary value of the "exclusive OR" function $Z1 = X1\bar{Y}1 + \bar{X}1Y1$ is equal to zero and consequently the one-output of this flip-flop F1 is not activated, the respective inputs of the AND gates $G^1_{10}$ and $G^1_{11}$ thereto connected are not activated. Hence, neither the output of AND gate $G^1_{10}$ nor the output of AND gate $G^1_{11}$ is activated, so that flip-flops FF2 and FF3 remain in the O-condition and the four-input AND gate G9 enables the passage of the clock pulses from generator CL to counter T. Counter T steps to its next condition and a fifth pulse $t5$ appears on the homonyme output thereof, this pulse $t5$ being used for examining the second line of the scanned group.

If flip-flop F1 of register RT' is in the one-condition ($Z1 = 1$) and flip-flop F1 of register RM' in the O-condition ($X1 = 0$), the output of the three-input AND gate $G^1_{11}$ will be activated at the occurrence of pulse $t4$ of counter T. The activated output of AND gate $G^1_{11}$ causes the setting of flip-flop FF2 to the one-condition via the $m$-input mixer M10 and after a small delay, the setting of flip-flop F1 of register RM' to the one-condition via delay D. Due to flip-flop FF2 being set in the one-condition the O-output thereof is deactivated, thus AND gate G9 disables the transmission of clock pulses from generator CL to counter T. Counter T does not step to its next condition and its output $t4$ remains activated. The activated one-output of flip-flop FF2 enables the two-input AND gate G13 to the passage of clock pulses from generator CL to counter V, so that counter V starts its counting cycle. The first pulse $v1$ of counter V, applied to the previously mentioned appropriate circuits of access arrangement AL of the scanner matrix (FIG. 1) via mixer M1, causes the reinterrogation of the scanner matrix row, which is selected by means of the $g$ outputs of part RA of register RC. At the same time, the above pulse $v1$ enables the two-input and gates $G^1_2$ to $G^m_2$, whereas it inhibits the three-input AND gates $G^1_1$ to $G^m_1$, since it is applied to the corresponding inputs thereof via inverter I1. Consequently, the binary bits registered by flip-flops F1 to F$m$ of register RP following to the above reinterrogation, correspond to the states of the respective cutoff relays Cor of the $m$ subscriber lines of the scanned group. The pulse $v2$ of counter V causes the transfer of the content of peripheral register RP to register RT. At the occurrence of pulse $v3$, the peripheral register RP is reset and a corresponding input of each of the three-input AND gates $G^1_{12}$ to $G^m_{12}$ is activated. If flip-flop F1 of register RT is at the O-condition ($Cor1 = 0$), the AND gates $G^1_{12}$ becomes conductive, since its three inputs $t4$, $v3$ and inverted one-output of flip-flop T1 of register RT are then activated. The activated output of AND gate $G^1_{12}$ causes, on the one hand the triggering of flip-flop FF4 to the one-condition via the $m$-input mixer M11, and on the other hand the inscription of the first line identity of the examined group of lines in part LI of register RC via mixer $M^1_8$ and encoder ENC. At the occurrence of the fifth pulse $v5$ of counter V, the information bits registered in parts RA and LI of register RC, which completely characterize the line identity, are transferred to a register (not shown) of an output stage OC for "new call processing" via the enabled three-input AND gates $G^k_{14}$. The pulse $v6$ of counter V causes the resetting of part LI of register RC and of flip-flops FF2 and FF4. Due to flip-flop FF2 being reset to the O-condition, the AND gate G13 is disabled whereas the AND gate G9 is enabled. Hence, the clock pulses are no longer applied to the advance input of counter V but are applied again to the advance input of counter T. Consequently, counter V returns to and stops in its rest condition (outputs $v1$ to $v6$ nonactivated) whereas counter T steps to the next condition (output $t5$ activated). If flip-flop F1 of register RT is in one-condition after the above mentioned reinterrogation, AND gate $G^1_{12}$ does not become conductive and no transfer of the line identity bits from parts RA and LI of register RC to the output stage OC takes place. As it has previously been mentioned, this latter condition, i.e. $Z1 = 1$, $X1 = 0$ and $Cor1 = 1$, is not a "new call" condition, but indicates that the cutoff relay of the examined line has been operated manually from the main distributing frame and therefore no action has to be carried out for this line.

Assuming now, that the flip-flops F1 of registers RT' and RM' both are in the one-condition when pulse $t4$ of counter T occurs, it is the output of the three-input AND gate $G^1_{10}$ which is then activated. The thus activated output of the AND gate $G^1_{10}$ causes: the setting of flip-flop FF3 to the one-condition via the $m$-input mixer M9, the inscription of the first line identity of the examined group in part LI of register RC via the mixer $M^1_8$ and the encoder ENC, and the activation of the corresponding input of the two-input AND gate $G^1_8$. The activated one-output of flip-flop FF3 enables the two-input AND gate G6 to the passage of the clock pulses from generator CL so that these clock pulses are now transmitted to counter H, which starts its counting cycle. The successive pulses $h1$ to $h19$ produced by counter H are distributed to the outputs $u1$ to $u10$ thereof in the manner previously described. As it has also previously been mentioned, the pulses $h1$, $h4$, $h7$, $h10$, $h13$ and $h16$, respectively appearing on the outputs $u1$ to $u6$, cause the readout operation of the corresponding six rows of memory part MH, whereas the pulses appearing on the outputs $u8$ and $u9$ enable the comparison network CN and perform the reset of the memory register RM via the mixer M6, respectively. It is to be noted that the called lines identities are stored in the ferrite cores of the memory part MH which correspond to the columns 1 to $g + d$ thereof. The last pulse $h19$ appearing on the output $u7$ causes the reset of part LI of register RC and the activation of the corresponding input of AND gate G7. In this way, i.e. with the counter H pulses, the six line identities stored in the corresponding six rows of the memory part MH are consecutively compared to the examined line identity which is registered in parts RA and LI of register RC. If a coincidence is detected by comparison network CN, i.e. if the examined line identity is stored in one of the six rows of the memory part MH, the single output thereof will be activated during the corresponding comparison of the coincident line identities and following to this activation, flip-flop FF1 will be set to the one-condition. Due to the flip-flop FF1 being set in the one-condition, neither the output of the two-input AND gate G7 nor the output of the two-input AND gate $G^1_8$ is activated at the occurrence of the pulse $h18$ on output $u10$ of counter H, so that the previous line state bit X1 registered by the flip-flop F1 of register RM ' remains unchanged. At the occurrence of the last pulse $h19$ on the output $u7$, the part LI of register RC and the flip-flops FF1 and FF3 are reset to zero. Due to the flip-flop FF3 being reset to the O-condition, the gate G6 is blocked and the gate G9 is enabled again to the passage of the clock pulses from generator CL. Consequently counter H returns to and remains in its rest condition, whereas counter T steps to its next condition and the next line examination starts. If no coincidence is detected by the network CN during the above consecutive comparisons, flip-flop FF1 will remain in the O-condition; hence, the outputs of the AND gates G7 and $G^1_8$ will be activated at the occurrence of the above pulse *h*18 at the output $u_{10}$ of counter H and the flip-flop F1 of register RM ' will thus be reset to the O-condition.

After the pulse *t*-3 of counter T with which the state of the *m*th line of the above group is examined, the occurrence of the pulse *tr*-2 causes, on the one hand the transfer of the content of register RM' to register RM via the enabled two-input AND gates $G^1_5$ to $G^m_5$ and on the other hand the setting to the one-condition of the writing order flip-flop of part RW of register RC. At the occurrence of the next pulse *tr*-1 of counter T, the updated bits X1 to X*m*, which have been transferred in memory register RM, are inscribed or stored in the corresponding ferrite cores of the memory part ME. At the occurrence of the last pulse *tr* of counter T parts RW and RA of register RC, as well as registers RM, RM' and RT' are reset to zero and an "end" signal is sent to a circuit (not shown) associated to the previously mentioned program counter (not shown) in order to acknowledge the end of the examination of the above group of lines. Due to the part RW being reset, the AND gate G9 is blocked and therefore counter T returns to and stops in its rest condition.

While the above detailed description of central processor CP considers specific and distinct circuits to perform the desired operations, it will be clear that the latter can be performed by means of a data processor provided with the usual essential elements, e.g. memory, accumulator register, computing unit etc., as well as a program and that in this manner some of the registers shown and described above, e.g. auxiliary registers RM' and RT', will in fact be replaced by the memory and accumulator registers. For instance, the bits Z1 to Z*m* resulting from the "exclusive OR" gating of the bits X1 to X*m* obtained from the memory and the bits Y1 to Y*m* obtained from the peripheral register may be registered in the accumulator register by substituting therein the previously registered bits X1 to X*m* or Y1 to Y*m*. Indeed, if the accumulator has been loaded with the memory bits X1 to X*m* the above "exclusive OR" gating takes place between the contents of accumulator register (X1 to X*m* ) and peripheral register (Y1 to Y*m*), the bits Z1 to Z*m* replacing the bits X1 to X*m* in the accumulator register. If the bits Y1 to Y*m* are first transferred from the peripheral register to the accumulator register, the "exclusive OR" gating takes place between the contents of memory register (X1 to X*m*) and accumulator register (Y1 to Y*m* the bits Z1 to Z*m* replacing the bits Y1 to Y*m* in the accumulator register. The memory of the data processor, apart from the previous line state bits X, stores the program instructions as well as other information. It is obvious that the above data processor can be associated to a plurality of peripheral line scanning arrangements which are similar to the described one.

While the principles of the invention have been described above in connection with specific apparatus, it is to be clearly understood that this description is made only by way of example and not as a limitation on the scope of the invention.

We claim:

1. A scanning system for scanning line circuits in telecommunication systems to determine the states of the line circuits scanned:

said line circuits having cutoff relays associated therewith;

said system including scanning means for periodically scanning the state of the said line circuits by scanning both line loop condition and said cutoff relay condition of said line circuits;

memory means for storing information about the last state of said line circuits obtained during the scanning preceding the present scanning;

line condition detecting means for comparing the information presently obtained by said scanning means with the corresponding information obtained from said memory means to detect new line conditions;

said scanning means being arranged to scan both the looped state of the line loops and the operational condition of the associated cutoff relays; and said memory means also being arranged to store information regarding the previous state of both the line loops and the associated cutoff relays.

2. The scanning system of claim 1, wherein each of said lines is respectively associated with one bit of said memory means: said one bit recording the binary value of a logical function of the state of the corresponding line loop and its associated cutoff relay.

3. The scanning system of claim 2, wherein said function is an OR logical function.

4. The scanning system of claim 3, wherein said lines are divided into groups:

said line scanning means including means for scanning one group of said lines at a time;

said line scanning means including OR gating means to individually provide the OR function of the binary state of each line loop or of its associated cutoff relay in a scanned group of lines;

said line condition detecting means including exclusive OR gating means to individually determine the binary value of the exclusive OR function from the OR functions formed by the binary values determined from said OR gating means and the binary state of the corresponding last previous line loop or cutoff relay state stored in said memory;

first and second register means for respectively registering the previous line state information provided by said memory means and the value of the individual exclusive OR function provided by said exclusive OR gating means; and sequential examination means for sequentially comparing the values registered in said first and second registers for detecting the line condition change and for modifying the corresponding binary values stored in said memory means.

5. The scanning system of claim 4, wherein said OR gate means are common to all groups of lines.

6. The scanning system of claim 5, wherein second memory means are provided for storing the identities of the called lines until the moment that corresponding cutoff relays are operated, and wherein said sequential examination means operates responsive to detecting a predetermined combination of the binary values corresponding to a same line in said first and second registers to sequentially examine the identity of said called lines in said second memory means and to modify the corresponding binary value stored in the first memory means only if there is no coincidence between the identity of the examined line and the identity of the line in said second memory means.

7. The scanning system of claim 6, wherein said sequential examination means operates responsive to detecting a second predetermined combination of the binary values corresponding to a same line in said first and said second register means to modify the corresponding value stored in said memory means.

8. The scanning system of claim 7, wherein inhibiting means are provided for decoupling the line loops of a scanned group of lines from said OR gating means:

said inhibiting means and said line scanning means both being operated responsive to said second combination being detected; and wherein means are provided for enabling the detection of the new called condition responsive to the state of the cutoff relay associated with the examined line.

9. The scanning system of claim 7, wherein means are provided for modifying the previous line state information stored in said first memory means corresponding to a noncalling line when said noncalling line is called.

10. The scanning system of claim 9, wherein said first and said second memory means are included in the same coordinate matrix memory system.